United States Patent [19]

Levin

[11] Patent Number: 5,272,830
[45] Date of Patent: Dec. 28, 1993

[54] COMPARTMENTALIZED FISHING CREEL

[76] Inventor: John M. Levin, 412 Fairview Rd., Penn Valley, Pa. 19072

[21] Appl. No.: 938,115

[22] Filed: Aug. 31, 1992

[51] Int. Cl.$^5$ .................................. A01K 97/00
[52] U.S. Cl. ................................ 43/55; 224/920
[58] Field of Search ........................ 43/54.1, 55, 56; 224/920; 206/315.11; 220/507

[56] References Cited

U.S. PATENT DOCUMENTS

| | | | |
|---|---|---|---|
| 232,680 | 9/1880 | Cammann | 43/55 |
| 1,619,634 | 3/1927 | Roat | 43/55 |
| 1,827,517 | 10/1931 | Hall | 43/55 |
| 2,153,549 | 4/1939 | Cooper | 43/54.1 |
| 2,555,073 | 5/1951 | Zdankoski | 43/55 |
| 3,181,267 | 5/1965 | Sawyer | 43/55 |
| 4,353,182 | 10/1982 | Junkas et al. | 43/55 |
| 4,570,374 | 2/1986 | Baxley | 43/55 |
| 4,870,778 | 10/1989 | Sheppard | 43/55 |
| 5,005,703 | 4/1991 | Bodker | 206/563 |
| 5,054,669 | 10/1991 | Zimbardi | 43/54.1 |

*Primary Examiner*—Paula A. Bradley
*Assistant Examiner*—James Miner
*Attorney, Agent, or Firm*—Caesar, Rivise, Bernstein, Cohen & Pokotikow, Ltd.

[57] ABSTRACT

A fishing creel which has individual compartments for fish which can be seen through see-through netting is disclosed. Each compartment has a one-way door for easy insertion of the fish. The compartments at the other end are blocked by a sliding panel, or alternatively by an end flap, which can be easily removed to allow access to the fish. The creel can be carried through the use of a shoulder strap or through use of belt loops.

29 Claims, 4 Drawing Sheets

COMPARTMENTALIZED FISHING CREEL

FIELD OF THE INVENTION

The present invention relates to fishing creels, and more particularly, to a compartmentalized fishing creel covered with a see-through mesh in which each individual fish is placed in each individual compartment.

Various types of fishing creels are known. U.S. Pat. No. 4,353,182 (Junkas, et al.) and U.S. Pat. No. 4,870,778 (Sheppard) disclose carriers which have separate bait and fish compartments.

U.S. Pat. No. 4,570,374 (Baxley) discloses the use of a mesh bag for holding fish. U.S. Pat. No. 5,005,703 (Bodker) discloses a plurality of sockets for holding crayfish arranged in rows. However, none of the presently known fishing creels are divided into a set of individual compartments, each of which holds one fish, which is inserted through a one-way door and removed through the use of a sliding panel with the fish visible through a see-through mesh, as is disclosed in the present application. This creel is particularly of value with fresh water or trout fishing, wherein the fisherman, his companions, or a game warden can see the number of fish caught instantly and can determine the size of the fish without the necessity for emptying out the fish from the creel. This is important because of strictures in the number of fish that may be caught during fishing seasons and the minimal allowable size of fish that are caught.

OBJECTS OF THE INVENTION

Accordingly, it is the general object of this invention to provide a fishing creel which improves upon and overcomes the shortcomings of present fishing creels.

It is a further object of this invention to provide a fishing creel which is light, easy, inexpensive to build and easy to use.

It is yet a further object of this invention to provide a fishing creel with individual compartments for each fish caught.

It is still yet a further object of this invention to provide a fishing creel made of a see-through mesh, which makes the fish inserted into each compartment visible.

It is another object of this invention to provide a fishing creel which allows the fish to dry after being caught and inserted into each compartment.

It is yet another object of this invention to provide a fishing creel with a positive means for insertion and a secure means for preventing the fish from falling out of each compartment after they have been inserted.

SUMMARY OF THE INVENTION

These and other objects of the invention are achieved by providing a fishing creel which is compartmentalized and which allows a single fish to be placed in each compartment. A see-through mesh allows visibility of the fish after they have been caught and placed in the compartments. Insertion into each compartment is made easy by use of a one-way door which securely holds each fish. A closure means, such as a sliding panel or a flap, is provided at the other end of the fishing creel, which, when opened, allows the fish to be removed from the compartments.

DESCRIPTION OF THE DRAWING

Other objects and many of the intended advantages of this invention will be readily appreciated when the same becomes better understood by reference to the following detailed description, when considered in connection with the accompanying drawings wherein.

DETAILED DESCRIPTION OF THE PREFERRED EMBODIMENT

Figure 1:
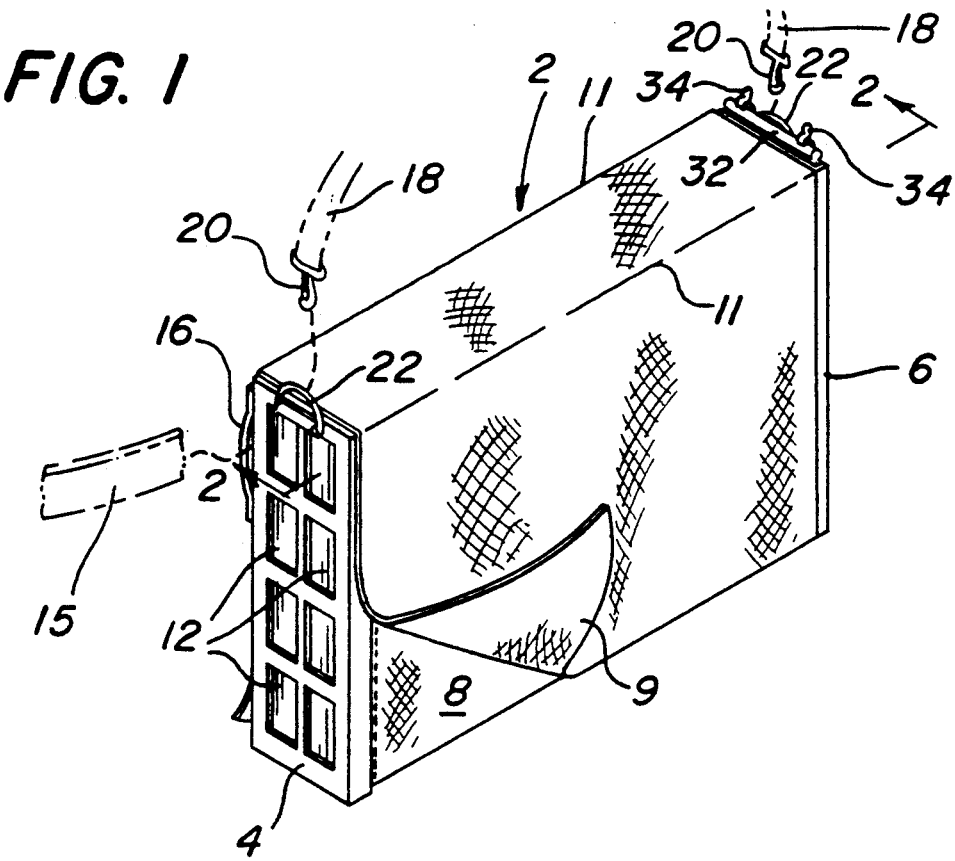
FIG. 1 is a perspective view of the fishing creel.

Referring now in greater detail to the various figures of the drawing, wherein like references and characters refer to like parts, the fishing creel 2 of the instant invention is shown in FIG. 1. The fishing creel 2 comprises a left end section 4, a right end section 6, and a see-through mesh or netting 8. Within the creel is a frame 10 (see FIGS. 3 and 4), which divides the internal space in the creel into eight compartments, two side by side columns of four compartments each. Eight one-way doors 12 are connected to the left end section 4 by hinges 14.

Figure 2:
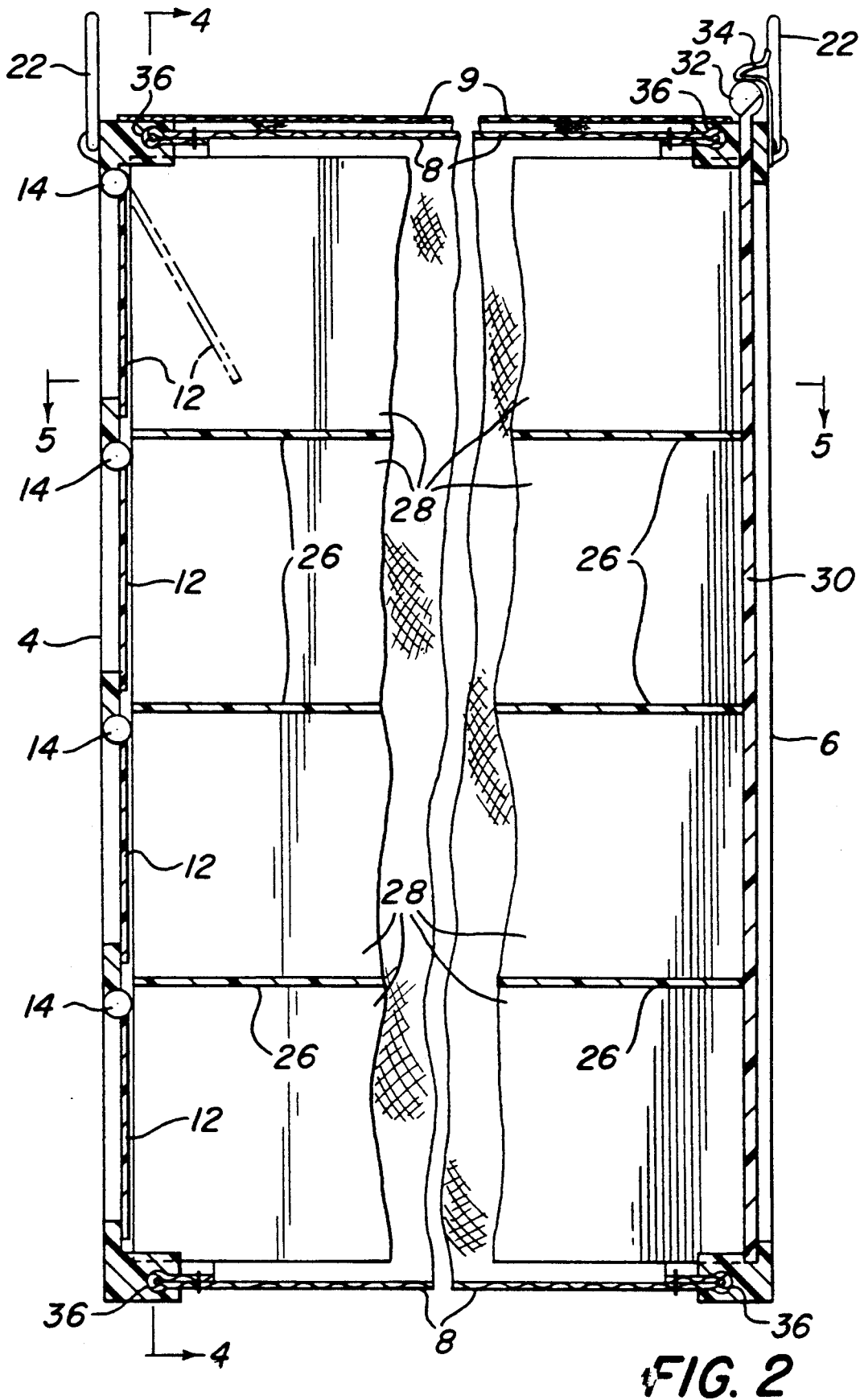
FIG. 2 is a sectional view of the fishing creel taken along the line 2—2 of FIG. 1.

As can be seen in FIG. 2, the one-way doors 12 are constructed so that they open inwardly only. Therefore, after the fisherman places each fish into its own individual compartment, the fish cannot fall out through the door in which it was inserted.

Referring again to FIG. 1, two methods are shown for carrying the fishing creel 2. One method is through the use of belt loops 16, which are installed on the left end section 4 and the right end section 6. The belt 15 of the fisherman can be placed through the loops 16, so that the creel can be carried during fishing. Another method for carrying the creel is through the use of a shoulder strap 18, which has a clasp 20 at each end. The clasps 20 are connected to rings 22, which are mounted to the end sections 4 and 6.

A cover 9 is placed across the sides and top of the netting 8 to prevent snagging of fish hooks and other objects on the netting 8 and to prevent the fish placed in the creel from being exposed to sunlight which would cause excessive drying of the fish. The cover 9 is sewn to the netting 8 by stitching 11. The cover 9 can be made of canvas or other suitable opaque material and can be raised to view the fish in the compartments.

Figure 3:
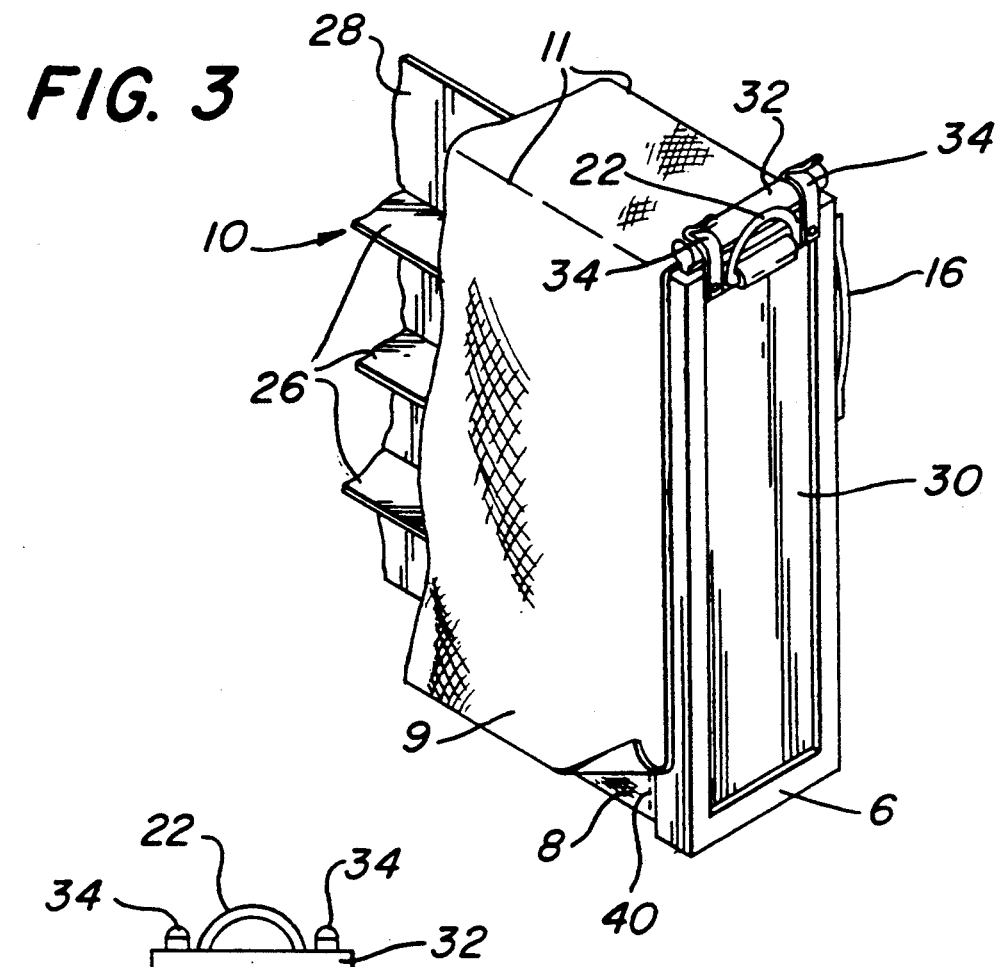
FIG. 3 is a perspective view of one end of the fishing creel which shows the internal frame used to define each of the individual compartments of the creel, and the sliding panel for allowing egress of the fish.
Figure 4:
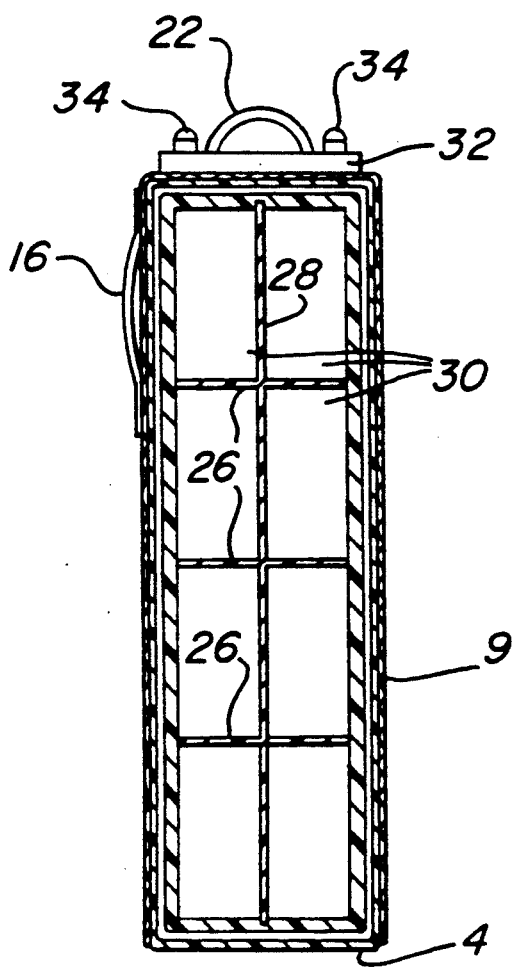
FIG. 4 is a sectional view of the fishing creel taken along the line 4—4 of FIG. 2.

The configuration of the internal frame 10 will now be explained. As can be seen in FIGS. 3 and 4, the internal frame 10 comprises a center wall 28 and horizontal shelves 26. The center wall 28 and horizontal shelves 26 create four rows of two side-by-side individual compartments. At one end of each compartment, as described previously, a hinged one-way door has been installed. At the other end of the compartments, to prevent the fish from falling out and to allow for removal of the fish when desired, is a sliding panel 30, which has a knob shaped top 32. With the panel 30 in place, it is secured by restraining straps 34, which are connected to the right end section 6. The straps 34 may be secured to the knob shaped top 32 by the use of snaps, buttons, velcro, or any other suitable attachment and detachment means. As can be seen in FIGS. 1, 3, and 4 there are two straps 34 used to secure the sliding panel in place.

When it is desired to remove the fish from the compartments, the straps 34 are disconnected from the knob shaped top 32 of the sliding panel 30 and the panel is lifted upwards until it is clear of the right end section 6, thereby exposing one end of the compartments.

The internal frame comprises solid wall 28 and shelves 26. Drainage holes may be provided (not shown) to allow the fish to dry. Alternatively, the internal frame 10 can be made of wire mesh or netting material which would also allow the fish to dry or to drain.

Figure 5:
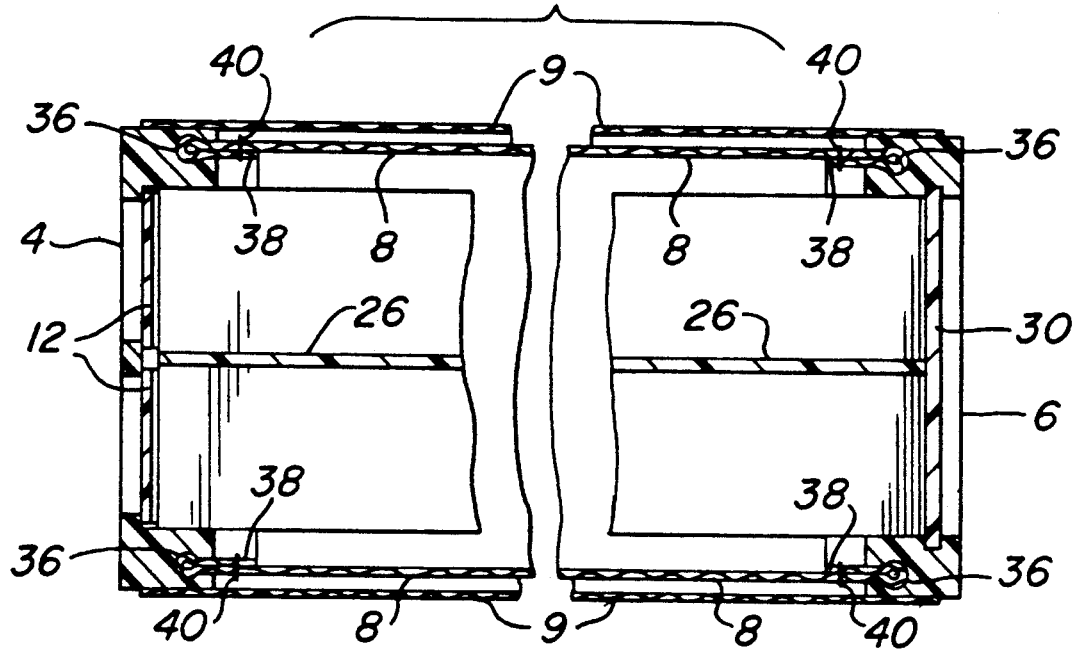
FIG. 5 is a sectional view of the fishing creel taken along the line 5—5 of FIG. 2.

The method for securing the netting 8 to the end sections 4 and 6 is shown in FIGS. 2 and 5. The left end section 4 and the right end section 6 each have a channel 36 along the inner periphery of the end sections. The netting material 8 is looped with the end of the loop placed in the channels 36. The free end of the loop 38 is then sewn to the netting 8 using stitches 40.

Figure 6:
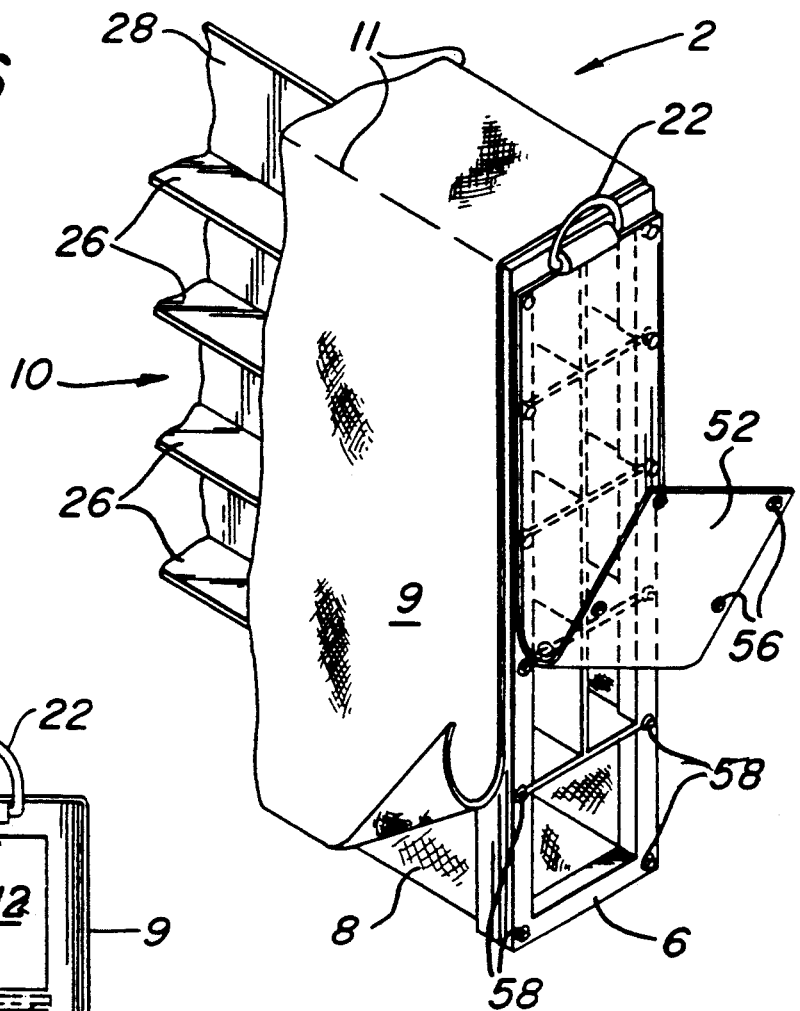
FIG. 6 is a perspective view of an alternate embodiment of the fishing creel showing an internal frame with an additional compartment and a flap for allowing egress of the fish.
Figure 7:
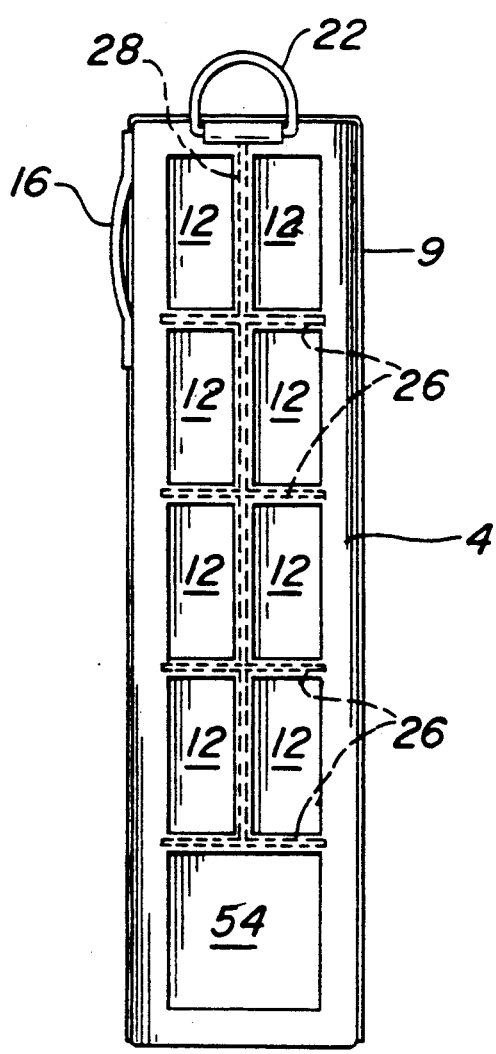
FIG. 7 is a vertical end view of the fishing creel showing the one-way doors of the alternate embodiment.

Another embodiment of the creel 2 is shown in FIGS. 6 and 7. In this embodiment the frame 10 has four horizontal shelves 26, dividing the interior of the creel 2 into nine compartments, two columns of four compartments each and a double width compartment 54 to hold a larger fish.

The sliding panel 30 of the first embodiment has been replaced by a side flap 52 to close the end of the compartments opposite the entry doors 12. The flap 52 can be made of canvas or any other suitable fabric or plastic material. The flap 52 is releasably fastened to the end frame 6 by snap buttons 56 on the flap 52 which mate with snap receivers 58 on the end frame 6.

The flap 52 can be released from the top or bottom of the end frame 6 as desired to provide egress of the fish from the compartments.

A fishing creel has been described, which is easy and inexpensive to manufacture, light and convenient to use. It provides an easy and efficient way to insert and secure fish as they are caught. Each fish is placed in an individual compartment through a one-way door and is visible through a see-through netting, which also allows the fish to dry out. Alternatively, a flap, connected to the creel by snap buttons, can be used instead of the sliding panel. The creel can be easily emptied by removing a sliding panel, which allows access to the compartments, or in the alternate embodiment by releasing the flap.

Without further elaboration, the foregoing will fully illustrate my invention so that others may, by applying current or future knowledge, readily adapt the same for use under the various conditions of service.

I claim:

1. A fishing creel for holding fish, said creel comprising:
   (a) a covering;
   (b) means for providing a plurality of separate, substantially parallel, elongate compartments, such of said compartments having opposed, axially spaced-apart first and second ends;
   (c) means adjacent said first end of said plurality of compartments for providing access to store fish in each one of said plurality of compartments;
   (d) means adjacent said second end of said plurality of compartments for providing egress for fish stored in each one of said plurality of compartments; and
   (e) means for holding said creel by a fishing person with said plurality of compartments being elongate in a horizontal direction and at least some of said compartments being vertically spaced from other compartments.

2. The creel of claim 1 wherein said creel further comprises first and second end sections, said axially spaced-apart first and second ends of said plurality of compartments being adjacent said first and second end sections, respectively.

3. The creel of claim 2 wherein said means for providing access to said plurality of compartments comprises a plurality of one-way doors, mounted on said first end section, each of said doors providing access to a respective one of said compartments.

4. The creel of claim 3 wherein each of said one-way doors is hingedly connected to said first end section.

5. The creel of claim 4 wherein said means for providing egress comprises a sliding panel.

6. The creel of claim 5 wherein said panel provides egress in a first open position and prevents egress in a second closed position.

7. The creel of claim 6 wherein said creel comprises means for holding said sliding panel in said second closed position.

8. The creel of claim 7 wherein said holding means comprises at least one strap with one end connected to said second end section and the other end releasably connected to said sliding panel.

9. The creel of claim 8 wherein said covering comprises see-through and porous material.

10. The creel of claim 9 wherein said see-through and porous material comprises netting and said creel further comprises means for attaching said netting to said first and second end sections.

11. The creel of claim 10 wherein said means for attaching said netting comprises a channel in said first and second end sections into which a loop of said netting can be placed.

12. The creel of claim 11 wherein said loop of netting comprises a free end and said means for attaching said netting further comprises stitching said free end to said netting.

13. The creel of claim 2 wherein said means for holding said creel comprises a pair of belt loops, each of said belt loops mounted on a respective one of said end sections.

14. The creel of claim 2 wherein said means for holding said creel comprises a shoulder strap connected to said first and second end sections.

15. The creel of claim 1 wherein said means for providing a plurality of compartments comprises a solid frame with a center wall and a plurality of shelves.

16. The creel of claim 15 wherein said frame further comprises drainage holes in said plurality of shelves.

17. The creel of claim 1 wherein said means for providing a plurality of compartments comprises a wire mesh.

18. The creel of claim 1 wherein said means for providing a plurality of compartments comprises netting material.

19. The creel of claim 1 wherein said plurality of compartments comprises two columns of compartments.

20. The creel of claim 1 wherein said cover comprises netting and said creel further comprises a means for preventing snagging of said netting.

21. The creel of claim 20 wherein said means for preventing snagging comprises a cover attached to said netting.

22. The creel of claim 1 wherein said means for providing egress comprises an end flap and means for releasably attaching said end flap to said creel.

23. The creel of claim 22 wherein said means for releasably attaching said end flap comprises snap buttons on said end flap and snap receivers on said creel.

24. The creel of claim 1 wherein said plurality of compartments comprises two columns of compartments and at least one double width compartment.

25. A fishing creel for holding fish, said creel comprising:
(a) a covering;
(b) first and second end sections;
(c) means for providing a plurality of separate compartments;
(d) means for providing access to store fish in each one of said plurality compartments, said means for providing access including a plurality of one-way doors mounted on said first end section, each of said doors providing access to a respective one of said compartments;
(e) means for providing egress for fish stored in each one of said plurality of compartments, said means for providing egress comprising a sliding panel; and (f) means for holding said creel by a fishing person.

26. The creel of claim 25 wherein said sliding panel is connected to the second end section.

27. The creel of claim 26 wherein said sliding panel provides egress in a first open position and prevents egress in a second closed position.

28. The creel of claim 27 wherein said creel comprises means for holding said sliding panel in said second closed position.

29. The creel of claim 28 wherein said covering comprises see-through and porous material.

* * * * *